United States Patent [19]

Ivey

[11] 4,037,691
[45] July 26, 1977

[54] CENTRIFUGAL LOCK UP CLUTCH FOR FLUID COUPLINGS

[75] Inventor: John Saxon Ivey, Bloomfield Hills, Mich.

[73] Assignee: Borg-Warner Corporation, Chicago, Ill.

[21] Appl. No.: 646,301

[22] Filed: Jan. 2, 1976

[51] Int. Cl.² .................. F16H 41/18; F16D 43/14
[52] U.S. Cl. ............................. 192/3.31; 192/45.1; 192/105 BA
[58] Field of Search ............... 192/45.1, 41 A, 103 B, 192/105 BA, 3.31, 3.28

[56] References Cited

U.S. PATENT DOCUMENTS

| 2,106,423 | 1/1938 | Lavaud | 192/3.31 |
| 2,552,747 | 5/1951 | Strimple et al. | 192/105 BA |
| 2,691,437 | 10/1954 | Dalrymple | 192/105 BA |
| 3,255,855 | 6/1966 | Peras | 192/105 BA |

Primary Examiner—Benjamin W. Wyche
Attorney, Agent, or Firm—Robert L. Zieg

[57] ABSTRACT

A speed responsive engaging mechanism, adapted for use in a hydrodynamic device to couple the turbine and impeller members, including a series of ramps formed in the turbine member each defining a cam surface. A friction shoe is provided in each ramp in contact with a cam surface and wedgingly engageable with the impeller member at a predetermined speed of rotation of the turbine element.

7 Claims, 7 Drawing Figures

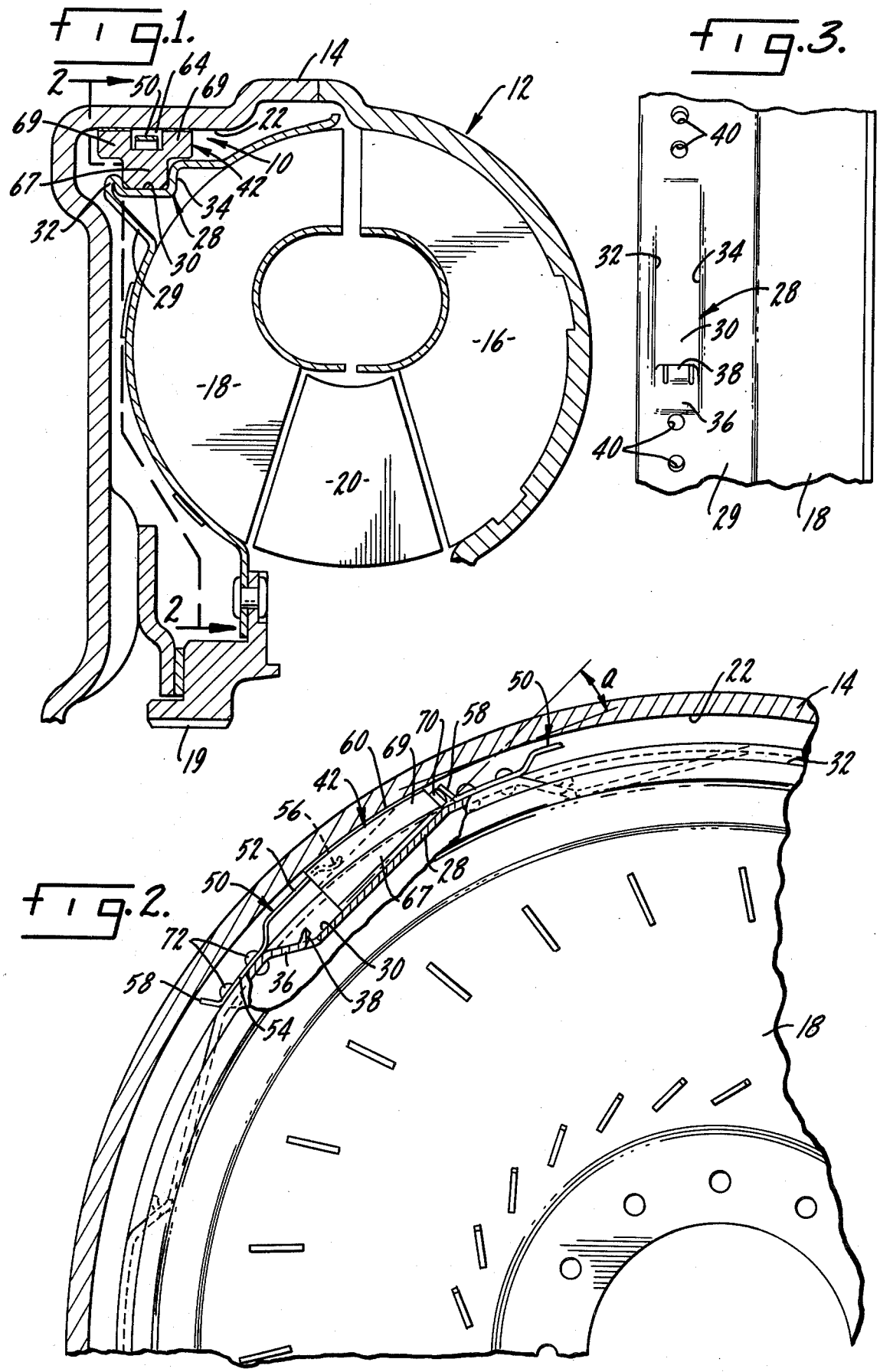

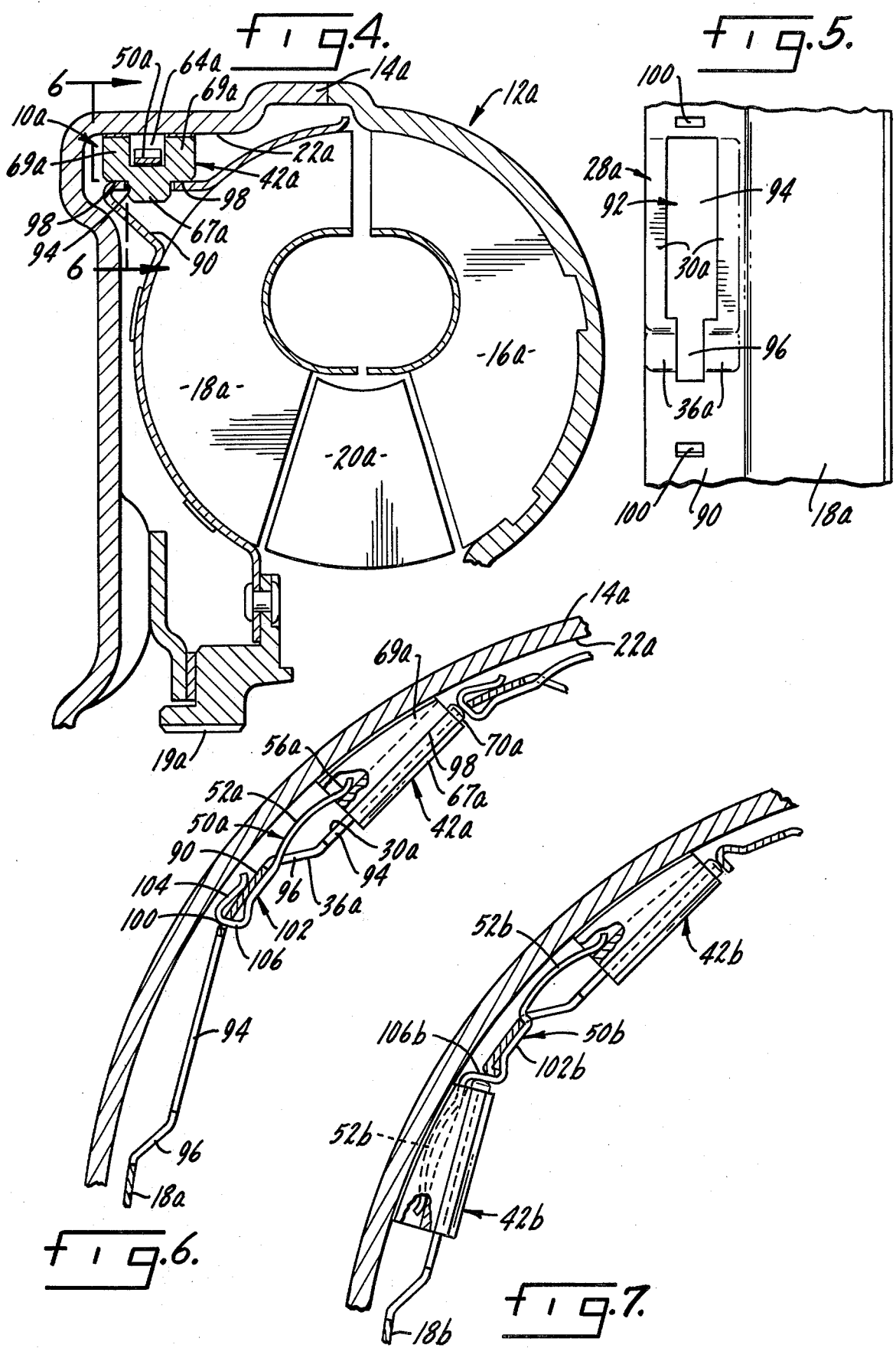

CENTRIFUGAL LOCK UP CLUTCH FOR FLUID COUPLINGS

BACKGROUND OF THE INVENTION

1. Field of the Invention

This application relates to the field of speed responsive engaging devices such as clutches.

2. Prior Art

It has been known in the prior art that it is desirable to have a clutch to lock the impeller and turbine elements of a hydrodynamic device together to eliminate slippage therebetween under certain conditions to improve the efficiency of the device. It is further known that it is convenient to use the speed of rotation of an element as a signal to initiate engagement and disengagement of the clutch. The engagement is critical, for example, when the lock-up clutch is used in a hydrodynamic device in combination with an automatic transmission. During an automatic ratio change, it is desirable that the clutch be disengaged so that torque changes occurring during the shift will not be harsh, due to the hydrodynamic device absorbing shocks. If the clutch in the hydrodynamic device remains engaged during a shift, the shift control to provide smooth shifts is more exacting since the normal shock absorbing characteristic of the hydrodynamic device is eliminated.

As pointed out, it is known to utilize speed responsive clutches as lock-up clutches in a hydrodynamic device. Normally, to insure that such clutches are engaged at the proper time, expensive and complicated controls of the mechanical, electric or hydraulic type are provided. Controls have been used to insure that the lock-up clutch is not engaged during an automatic shift. In addition, the clutch structures performing such functions are normally in themselves quite complicated. In addition, it is known from prior application Ser. No. 620,461 of common assignee to use a wedgingly engaged torque sensitive clutch between the turbine and impeller units of a hydrodynamic device utilizing an annular support having cam surfaces thereon secured to the turbine member.

Accordingly, it is the primary object of the present invention to provide a lock-up clutch for a hydrodynamic device of a simple design which will engage and disengage at the proper time without the use of external control mechanisms to determine the points of engagement and disengagement, while at the same time requiring a minimum of additional parts to perform the clutching function. Further, it is an object of the present invention to provide a speed and torque responsive clutch in a hydrodynamic device which can be physically accommodated within minimum axial and radial dimensions. Further, it is an important object of the present invention to provide a lock-up clutch for a hydrodynamic device which will automatically permit speed differentials within the device during specific operating conditions such as ratio change.

SUMMARY OF THE INVENTION

The present invention achieves the above-enumerated objects by utilizing a speed and torque responsive, self-energizing wedge type, engagement of friction shoes. Conveniently, the turbine member of a hydrodynamic device has formed therein a series of ramp-like depressions each having a cam surface and each having a friction shoe cooperating therewith. Centrifugal force moves the shoes radially outwardly to engage an inner annular surface on the impeller drive member. A series of leaf springs are connected to the turbine member and engage the friction shoes to resist their outward radial movement.

After initial frictional engagement of the shoes, the cam surfaces in contact with the shoes provide a wedging effect to urge the shoes into engagement. A hysteresis effect is provided, since the shoes will disengage due to the wedging action at a lower speed of rotation than that at which they engaged. In addition to the leaf springs, a coil spring is mounted in a bore in each of the friction shoes to resist movement of the friction shoes with respect to the ramp and cam surfaces.

In addition to the hysteresis effect of the wedging engagement, the present invention provides a torque sensitive function. It has been found that in torque surges which will occur on upshifts in an automatic transmission, the capacity of the lock-up clutch is such that it will momentarily permit speed difference between the impeller and turbine elements. Additionally, in torque reversal conditions, such as will occur during a down shift when the torque tends to flow momentarily from the turbine member to the impeller member as opposed to the normal flow from the impeller member to the turbine member, the friction shoes momentarily permit speed difference between the impeller and turbine members. It is to be understood that such permission of speed difference (or slipping) between turbine and impeller elements by the lock-up clutch will be characterized herein as a release of the clutch although the friction shoes may remain in contact during this condition. The automatic release during ratio change is extremely important to maintain the shock absorbing function of the torque converter during such ratio changes.

It should be noted that prior application Ser. No. 620,461 filed Oct. 7, 1975 and of common assignee presents a similar construction to the clutch described herein, and such application is incorporated herein by reference. The clutch construction presented herein has the ramp and cam surfaces formed into the turbine surface, whereas in the prior application, such ramp and cam surfaces were provided in a separate sheet metal ring secured or welded to the turbine surface.

BRIEF DESCRIPTION OF THE DRAWINGS

FIG. 1 is a cross-sectional view through a hydraulic torque converter structure having a speed responsive clutch embodying the principles of the present invention;

FIG. 2 is a cross-sectional view taken along the lines 2—2 of FIG. 1;

FIG. 3 is a fragmentary view of a portion of the turbine member of FIG. 1;

FIG. 4 is a cross-sectional view of a modified form of speed responsive clutch;

FIG. 5 is a fragmentary view of a portion of the turbine member of FIG. 4;

FIG. 6 is a view taken along the lines 6—6 of FIG. 4; and

FIG. 7 is a view similar to FIG. 6 showing a modified form of the leaf spring of FIG. 6.

BRIEF DESCRIPTION OF THE PREFERRED EMBODIMENT

Referring to FIG. 1, an improved lock-up clutch or engaging mechanism 10 is illustrated. The clutch 10 is shown in location in a hydrodynamic device 12 of the type normally referred to in the art as a hydraulic torque converter, having a drive shell 14 connected to drive a vaned impeller member 16 in a known manner. The hydraulic torque converter 12 includes a vaned turbine member 18 driven hydrodynamically by impeller 16 and a stator member 20. The improved lock-up clutch 10 is operative to lock the turbine 18 to the impeller 16 by means of frictional engagement between the clutch 10 and an internal annular surface 22 of shell 14. The impeller shell 14 is of conventional construction as, for example, illustrated in U.S. Pat. No. 3,859,872 showing the connection between the shell and the impeller member. In a vehicle installation, shell 14 is connected to the vehicle engine to be driven thereby. The turbine 18 is splined at 19 so as to be connected to a transmission input shaft to drive same in response to rotational drive of the turbine by the impeller.

Referring to FIGS. 1, 2, and 3, the improved lock-up clutch 10 is generally comprised of a series of supports or ramps 28 formed in the surface of turbine 18. The surface is first formed to provide portions 29 extending outwardly from the normal annular configuration of the turbine at selected locations. A ramp 28 is formed in each of the portions 29. Each ramp or support 28 includes a cam surface 30. Portions 29 and ramps 28 may be equally spaced around the periphery of turbine 18, although such arrannngement is not necessary as long as a rotationally balanced condition is maintained. The ramps 28 are formed by metal forming techniques to form selected areas of portions 29 inwardly. The cam surface 30 has an angle $a$ with respect to a tangent to the annular surface 22 at the intersection of the general plane of surface 30 therewith. One operative embodiment operated suitably with angle $a$ at approximately 6°.

As stated, ramps 28 are formed by known sheet metal techniques in which sheet metal dies would form the annular surface of turbine 18 into the desired shape at several locations around the periphery thereof. During the forming, the metal in the area of ramps 28 is pushed inwardly. Also, a lip 32 is formed along the left edge of ramp 28 as viewed in FIG. 3, and a shoulder 34 running parallel to lip 32 is formed opposite the lip 32. At the same time, a curving connecting section 36 is formed extending between the area of ramp surface 30 and the annular surface of turbine 18. In addition, an abutment tang 38 is punched out of the section 36 and extends radially outwardly therefrom.

Between the ramps 28 and around the periphery of turbine 18, pairs of rivet holes 40 are pierced in the turbine surface.

Received within the supports or ramps 28 are a plurality of friction shoes 42. Referring to FIG. 2, a plurality of leaf springs 50 are provided, each having a spring arm section 52 and a support section 54. Spring portion 52 includes an arcuate engaging surface 56. Support section 54 has a reaction portion 58 thereon extending upwardly as seen in FIG. 2 at an angle from support section 54.

Friction shoes 42 comprise generally rectangular blocks having formed thereon an arcuate surface 60 which optionally may have bonded or otherwise secured thereto a friction lining which may be, for example, a paper type friction lining as is known in clutches and brake band devices. The shoes have a longitudinally extending U-shaped groove 64 formed therein in the surface 60. Also provided in the shoes 42 is a bore which is adapted to receive a spring cap assembly 70.

The shoes 42 have a downwardly extending central rectangular portion 67 extending the length thereof with a pair of support shoulders 69 on either side of portion 67. When the shoes 42 are in place, the portions 67 are received between lip 32 and shoulder 34 with the lower side of portion 67 resting on the cam surface 30.

The shoes 42 are held in place and urged radially inwardly by engagement of engaging portion 56 of spring 50 within the groove 64 in shoes 42. Rivets 72 are provided extending through holes 40 and holes in leaf spring 50 to secure springs 50 in place. Spring 50, being engaged within the groove 64, urges friction shoes 42 out of engagement with inner annular surface 22 of shell 14.

Reaction portion 58 of springs 50 are engaged by spring cap assembly 70. Details of the spring cap assembly 70 may be obtained by reference to the above-mentioned copending application Ser. No. 620,461. Thus, as illustrated in FIG. 2, around the periphery of the turbine 18 are provided a series of friction shoes 42 urged radially inwardly by springs 50 out of engagement with annular surface 22 and, held in position by portion 58 of spring 50, the engaging portion 56 of an adjacent spring 50. The spring 50 and spring assembly 70 urge shoes 42 down the ramp into engagement with tang 38.

The operation of the lock-up clutch 10 of the present invention is that when a predetermined speed of turbine 18 is reached, sufficient centrifugal force acts on the shoes 42 to urge them radially outwardly against the force of springs 50 and assembly 70, tending to engage arcuate friction surface 60 with annular inner surface 22. At this time, the friction shoes 42 will attempt, through frictional engagement with impeller shell 14, to lock turbine 18 to impeller shell 14. This frictional engagement energizes the device such that the cam surfaces 30 tend to further engage friction shoes 42 by means of a wedging action. The lock-up clutch 10 is thus self-energizing in the engaging direction, due to the wedging effect of ramps 30 on shoes 42.

Referring to FIG. 2, between the engaged and disengaged positions of shoes 42, the shoes 42 move in a substantially circumferential direction. The substantially circumferential movement of shoes 42 is comprised of both arcuate movement with respect to shell 14 as well as chordal movement of shoes 42 with respect to shell 14 along surface 30. This movement of shoes 42 represents the wedging action of shoes 42 during engagement.

It has been found that due to the wedging action, a desired hysteresis effect is inherent in the present structure in that although the device tends to lock up and engage the friction shoes 42 at a predetermined RPM, the wedging action holds the shoes 42 in engagement such that they will not come out of engagement due to action of springs 50 and 70 until a lower RPM than the engaging RPM is reached. Thus, due to the wedging engagement of friction shoes 42, hunting, i.e., rapid changes between lock up and released positions of lock-up clutch 10, is prevented.

It is to be understood that the use of the term "disengaged" herein is meant to indicate a condition in which shoes 42 move radially inwardly out of contact with surface 22. When the term "released", as applied to clutch 10, is used herein, it is intended to include a condition in which shoes 42 may still be in contact with surface 22, but the engaging forces are such that slipping of surface 22 with respect to shoes 42 may take place or, in other words, turbine 18 and impeller 16 may rotate at different speeds. Of course, the term released is also meant in its broad sense to include the disengaged condition described above.

As more particularly described in the aforementioned copending application Ser. No. 620,461, anytime the throttle of the vehicle is suddenly depressed to demand higher torque, the torque capacity of clutch 10 may be exceeded causing clutch 10 to release and allowing the hydraulic torque converter to return to slipping condition, which is desired at such times. This condition may also occur on upshifts when a sudden surge or increase in torque will occur momentarily, as explained previously.

When a torque reversal occurs in the drive-line, due to the inherent characteristics of clutch 10, the wedging effect is removed, and the torque capacity of clutch 10 drops. This explains why the clutch momentarily releases on down shifts, since a torque reversal occurs at such times. As previously explained, during shifting, release of clutch 10 is desired to allow the converter to return to its shock absorbing characteristics.

It has also been illustrated during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a lock-up clutch at the time of the shift, the shift could be much harsher than desirable.

As stated earlier, the shoes 42 have a friction lining thereon which may be of a paper type. It is contemplated that in one embodiment of the present device, shoes 42 may be of aluminum and, of course, turbine 18 is of sheet steel. It will be apparent that the coefficient of friction of the friction lining is different from that of the shoe 42 surface which engages surface 30. Thus, with the present invention, the device may be altered to have different engaging characteristics by changing either the material of the friction lining or the material of shoe 42 or both. It has been found that it is highly desirable to have the friction lining of higher coefficient of friction than the lower surface of the shoes so that the force required to move the shoes with respect to the surfaces 30 will be less than that to move shoes 42 with respect to surface 22, considering equal normal forces between shoes 42 and surfaces 30 and between shoes 42 and surface 22.

From the above, it will be apparent that the present invention provides a speed responsive clutch which achieves unique results as a lock-up clutch for a hydrodynamic device having all the desired operating characteristics for a clutch in this environment, yet involves very few parts. These characteristics achieved by the present invention are: lock up of turbine and impeller elements at proper times, release during automatic ratio change to use the natural shock absorbing features of the hydrodynamic device, no hunting between engaged and released conditions, smooth engagement and disengagement, and no requirement for complex mechanical, hydraulic, or electronic speed-sensitive controls to properly time engagement and disengagement. Further, no additional parts are required to be welded to the turbine to provide the ramps and cam surfaces since the ramps are formed in the turbine itself.

Referring to FIGS. 4, 5, and 6, an alternative form of construction is illustrated. Structural elements in the FIGS. 4, 5, and 6 embodiment where similar carry like numbers to the corresponding elements in the FIGS. 1 through 3 embodiment with the addition of the suffix a.

In general, the embodiment of FIG. 4 is similar to that of FIG. 1, with the exception that the cooperation between the friction shoe 42a and the supporting structure therefor in the turbine 18a is different and a different form of spring 50a is utilized.

Turbine 18a has a formed portion 90 formed therein similar to portion 29 of FIG. 1 which involves the forming of the cam surface 30a without the formation of shoulders on either side thereof as is in the FIG. 1 construction.

The ramps 28a formed by moving the sheet metal radially inwardly as best seen in FIG. 6 forming the surface 30a and the connecting portion 36a connecting the external surface of the turbine with the section of the ramp having surface 30a thereon. In the formation of the ramps 28a, an elongated slot 92 is punched in the metal with a wide portion 94 and a narrow portion 96. As will be described in more detail, the spring 50a passes through portion 96 of slot 92, and the depending portion 67a of the friction shoe 42a is received within the slot 94. On the underside of each of the shoulders 69a of friction shoe 42a are flat surfaces 98a which contact cam surfaces 30a, thus the friction shoe 42a is supported by the surfaces 98a.

In addition, small slots 100 are punched at locations around the periphery of turbine 18a which are to receive the springs 50a. The spring 50a has a spring arm 52a similar to spring arm 52 of the spring 50 shown in FIG. 2; however, spring 50a is secured to the turbine in a different manner. The spring 50a has a securing end 102 which comprises a tab portion 104 which is bent back over the spring to form a reaction surface 106. In assembly, the arm 52a of the spring 50a is passed through one of the slots 100 and then assembled into the position illustrated in FIG. 6, whereby the tab portion 104 tightly engages the bent out portion 90 of the turbine shell 18a to secure the spring 50a in position. Reaction portion 106 is engaged by one of the spring assemblies 70a in a like manner to that described for reaction surface 58 in the FIG. 2 construction.

Thus, as will be seen, an entirely flat surface 30a is formed in a ramp 28a which supports the friction shoe on either side thereof, and provision of a spring which can be secured to the turbine without the use of rivets is provided in the FIGS. 4 through 6 construction.

In FIG. 7, an alternate form of spring 50b is shown which may replace spring 50a of FIG. 6. Each spring 50b is constructed to carry two spring arms 52b at either end thereof and having in the middle thereof a reaction portion 106b. As in the FIG. 6 construction, the spring has a securing portion 102b which engages with the inside surface of the turbine 18a, and the spring is held in place by the cooperation of securing portion 102b with the spring arms 52b engaging the friction shoes 42b on either end of the spring. Thus, in the FIG. 7 construction, additional rivets are not required, and in addition, the slots 100 as shown in the FIG. 5 construction are not required.

With the exception of the form of the spring 50b illustrated in FIG. 7, the FIG. 7 embodiment is intended to be identical in construction to the FIGS. 4 and 5 embodiment.

It should be noted that when portions 29 are formed in turbine 18, a pocket is formed in the normal fluid cavity of the turbine. To insure that these pockets do not vary or change the efficiency of the turbine, a liner or dam of sheet metal can be secured in the turbine shall in the area of portion 29 to isolate same from the normal fluid flow path through the converter. However, it is expected that any reduction in efficiency of the converter due to portions 29 is so minor as to not require the dam or liner.

Various features of the invention have been particularly shown and described; however, it should be obvious to one skilled in the art that modifications may be made therein without departing from the scope of the invention.

What is claimed is:

1. An engaging mechanism having first and second relatively rotating members, said first member comprising an annular shell, a series of ramps formed on said annular shell, a plurality of friction devices mounted between said ramps and said second member, cam means on said ramps in engagement with said devices, said devices having a frictional surface thereon, centrifugal force acting to urge said devices to move into engagement with said second member at a given speed of rotation to lock said members for rotation together, said cam means acting after initial engagement to wedge said devices between said ramps and said second member to increase the torque capacity of said engaging mechanism, said series of ramps being defined by forming said shell to provide a ramp area extending axially from said annular shell and forming said ramps inwardly in said ramp area.

2. A mechanism as claimed in claim 1, wherein a plurality of spring means are mounted on said first member and in engagement with said friction devices to resist outward movement of said friction devices and urge said devices inwardly.

3. A mechanism as claimed in claim 2, wherein said spring means comprise a plurality of leaf springs secured to said first member and in engagement with said engaging devices.

4. A mechanism as claimed in claim 1, wherein said engaging devices comprise a plurality of friction shoes, said shoes having an arcuate engaging surface thereon shaped to conform to a mating surface on said second member.

5. A speed responsive clutch mechanism for use in a hydraulic torque converter having impeller and turbine elements comprising a series of ramps formed in said turbine, a plurality of friction devices mounted in said ramps, cam means on said ramps in engagement with said devices, said devices having a frictional surface thereon, centrifugal force acting to urge said devices to move radially into engagement with said impeller at a given speed of rotation to lock said members for rotation together, said cam means acting after initial engagement to wedge said devices between said turbine and said impeller, thereby increasing the torque capacity of said clutch, said turbine including an annular shaped shell, and said series of ramps are formed by deforming said shell to provide portions thereof extending outwardly from said annular shape and forming said ramps radially inwardly in the area of said outwardly extending portions.

6. A clutch mechanism for use in a hydrodynamic device having fluid driving and driven rotating elements comprising a series of ramps formed in one of said elements, a plurality of friction devices mounted in said ramps, cam means on said ramps in engagement with said devices, said devices having a frictional surface thereon, centrifugal force acting to urge said devices to move radially into engagement with said other element at a given speed of rotation to lock said members for rotation together, said cam means acting after initial engagement to wedge said devices between said elements thereby increasing the torque capacity of said clutch, said one element including an annular shaped shell, and said series of ramps being defined by forming said shell to provide a ramp area extending from said annular shape and forming said ramps radially inwardly in said ramp area.

7. A clutch mechanism as claimed in claim 6 wherein said one element is a fluid turbine and said other element is a fluid impeller.

* * * * *